United States Patent [19]

Inoue

[11] Patent Number: 5,506,924
[45] Date of Patent: Apr. 9, 1996

[54] LIGHT GUIDING PLATE

[75] Inventor: Satoshi Inoue, Tokyo, Japan

[73] Assignee: Inoue Denki Co., Inc., Tokyo, Japan

[21] Appl. No.: 294,685

[22] Filed: Aug. 23, 1994

[51] Int. Cl.[6] .................................................. G02B 6/10
[52] U.S. Cl. ........................... 385/129; 385/147; 385/901
[58] Field of Search .................................. 385/129, 130, 385/131, 132, 147, 901; 362/32

[56] References Cited

U.S. PATENT DOCUMENTS 4,151,582  4/1979  Grunberger ............................... 362/31
4,765,701  8/1988  Cheslak ................................. 385/901 X
4,898,439  2/1990  Mori .................................... 385/901 X

FOREIGN PATENT DOCUMENTS

3602819    7/1986  Germany ............................ 385/901 X
62-237403 10/1987  Japan ................................ 385/901 X

*Primary Examiner*—Brian Healy
*Attorney, Agent, or Firm*—Jordan and Hamburg

[57]                ABSTRACT

A light guiding plate has grooves or ridges with respective bottom or peak portions having surfaces with curvilinear sectional contours. The curvilinear portions replace angular intersections of slanted surfaces of the grooves or ridges and thereby provide uniform luminance over an entire face of the light guiding plate.

19 Claims, 10 Drawing Sheets

LIGHT GUIDING PLATE

BACKGROUND OF THE INVENTION

The present invention relates to a light guiding plate comprised of a transparent plate having on its one side a multiplicity of grooves or ridges on which rays of light emitted from light sources, such as fluorescent lights or light emitting diodes, are diffusely reflected, and more particularly, to a light guiding plate ensuring a uniform luminance throughout the entire light guiding plate.

In the case of a back lighting means or a back light for a liquid crystal display, it is desirable that the rays of light be diffused as uniformly as possible for effective view of the display. Recently proposed and put into practical use, as such a light diffusing measure is a method in which a transparent plate used for transmission of light is used as the light diffusing means.

Figure 14:
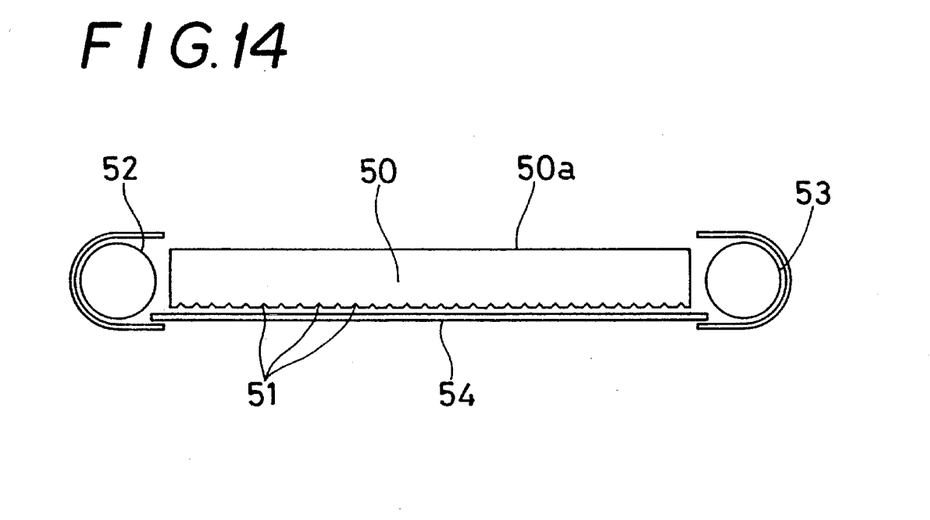
FIG. 14 is a side elevation of a lighting unit having a conventional light guiding plate.
Figure 15:
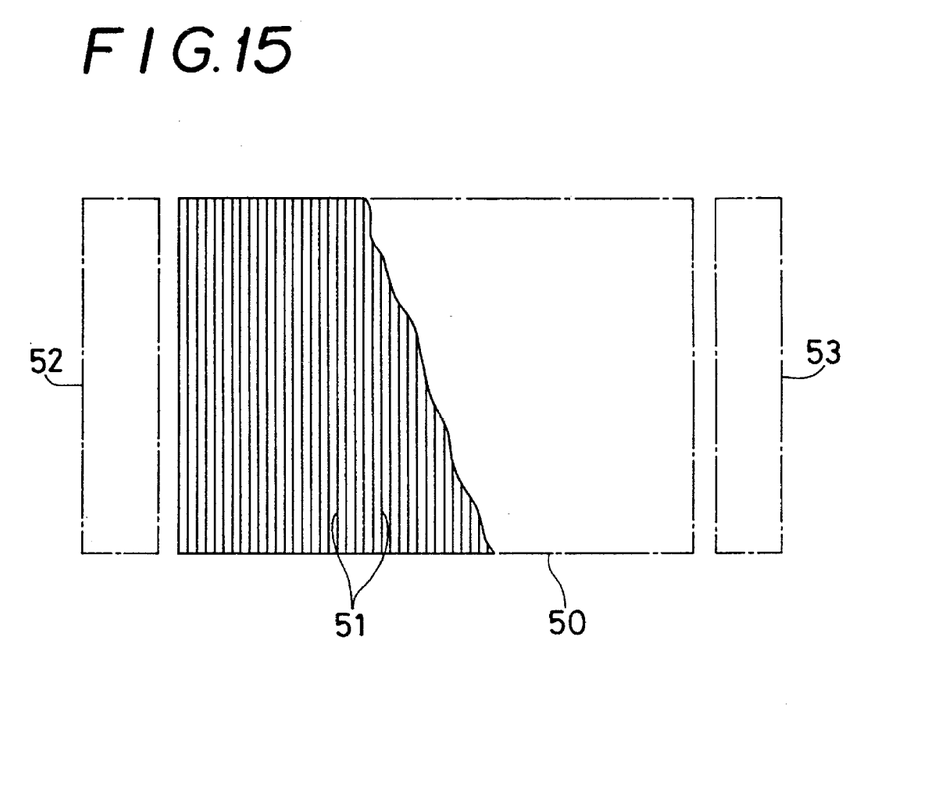
FIG. 15 is a rear elevation of the lighting unit shown in FIG. 14.

FIGS. 14 and 15 depict a specific configuration of a lighting means laid open to public inspection under Provisional Publication Nos. 165504/90 and 176692/90.

The lighting means comprises a plate material (hereinafter referred to as "light guiding plate"), designated at reference numeral 50, formed from a transparent material such as acrylic resin or other plastic and glass. The light guiding plate includes on a first side a multiplicity of grooves 51 having a substantially V-shaped section and extending parallel to a width direction of the light guiding plate 50 (See FIG. 15). The lighting means further comprises a pair of light sources 52 and 53, such as fluorescent lights, disposed on both lateral sides of the light guiding plate 50, and a reflection plate 54 arranged parallel and close to the first side of plate 50. Rays of light emitted from the light sources 52 and 53 travel through the grooves 51 of the light guiding plate 50 and the auxiliary rear reflection plate 54, and emerge from the face 50a of the light guiding plate 50 to illuminate an object. The lighting means of this type provides relatively satisfactory functions, producing a relatively uniform reflection of light on the grooves and reducing attenuation of light emitted from the light sources.

Figure 16:
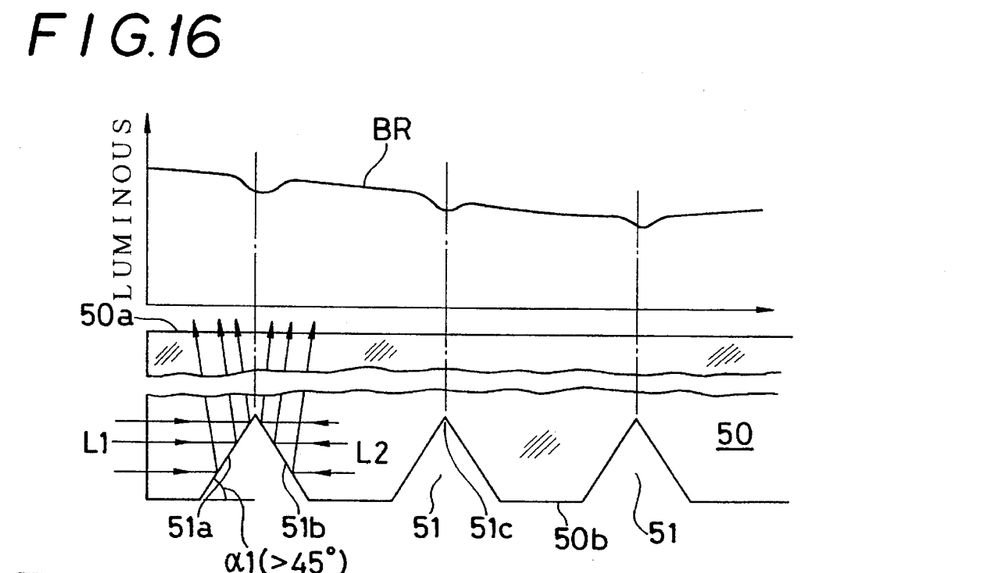
FIG. 16 is a combination of an enlarged fragmentary side view of a light guiding plate showing, by way of example, the state of rays of light being reflected in the conventional lighting unit, and a diagrammatic view representing luminance measured on the front of the light guiding plate positionally corresponding to the reverse side of the light guiding plate.
Figure 17:
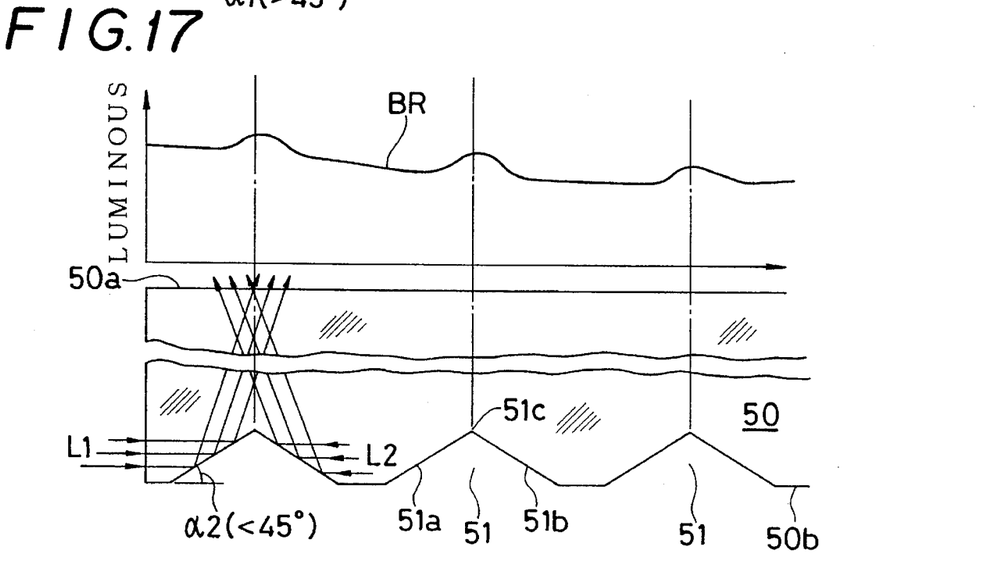
FIG. 17 is a combination of an enlarged fragmentary side view of a light guiding plate showing another example of the state of rays of light being reflected in the conventional lighting unit, and a diagrammatic view representing luminance measured on the front of the light guiding plate positionally corresponding to the reverse side of the light guiding plate.
Figure 18:
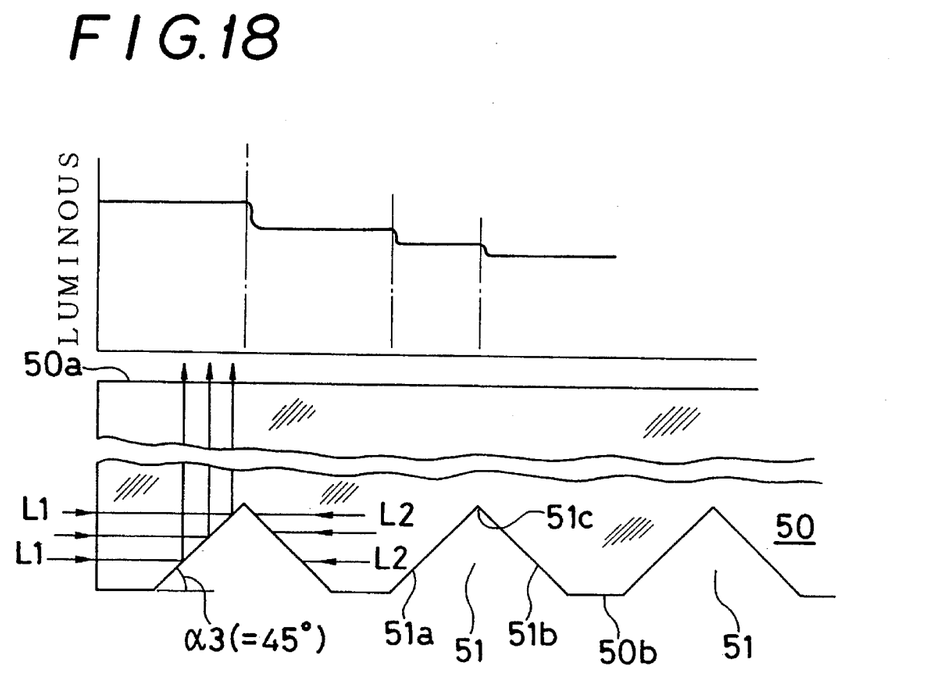
FIG. 18 is a combination of an enlarged fragmentary side view of a light guiding plate showing a further example of the state of rays of light being reflected in the conventional lighting unit, and a diagrammatic view representing luminance measured on the front of the light guiding plate positionally corresponding to the reverse side of the light guiding plate.

FIGS. 16 to 18 depict more specifically the characteristics of the above lighting means. Referring first to FIG. 16, rays of light L1 from the light source 52 impinge on a slanted surface 51a of the groove 51 in the form of parallel rays, most of which are reflected as indicated by arrows into the light guiding plate 50 for emittance from the face 50a. Rays of light L2 from the light source 53 fall on a slanted surface 51b adjoining the slanted surface 51a of the light guiding plate 50 and, like the rays of light L1, are internally reflected into the light guiding plate 50. In this case, if an angle α1, which the slanted surfaces 51a and 51b form with respect to the reverse side 50b of the light guiding plate 50, is more than 45 degrees, the reflected rays of light are directed outwardly around groove bottoms 51c in a diverging manner. This results in a reduction in the amount of light emerging from regions of the face 50a of the light guiding plate 50 which correspond to the groove bottoms 51c. As seen from the upper diagram representing the luminance BR on the face 50a of the light guiding plate 50, the luminance of these regions will be lowered and hence striped low-luminance portions will appear on the face 50a of the light guiding plate 50 corresponding to the bottoms 51c of the grooves 51. Although such low-luminance portions do not actually occur as sharp as depicted, since the rays of light L1 and L2 emitted from the respective light sources 52 and 53 are not completely parallel rays, the light pattern produced will disadvantageously permit perceptible striped low-luminance portions to appear.

FIG. 17 depicts a case adverse to the above, in which an angle α2 which the slanted surfaces 51a and 51b of the groove 51 form with respect to the reverse side 50b of the light guiding plate 50 is less than 45 degrees. In this case, the rays of light L1 and L2 will be inwardly reflected toward the groove bottoms 51c in a converging manner. Consequently, as opposed to the above-described case, the luminance of the portions of the face 50a of the light guiding plate 50 corresponding to the bottoms 51c will become higher than that of their peripheries.

In this manner, the configuration shown in FIGS. 16 and 17 will basically result in the occurrence of optical unevenness. Thus, the conventional technical development has emphasized the reduction of the possible unevenness of luminance to a degree imperceptible with unaided eye, on the assumption that it is impossible to completely prevent this optical unevenness from occurring. More specifically, the number of grooves to be formed is increased to lessen the intervals of the grooves correspondingly to which the luminance will vary on the face of the light guiding plate, whereby the lower and higher luminance portions are optically combined with unaided eye to allow the entire light guiding plate to be perceived to have relatively uniform luminance. Inconveniently, this will necessitate a minute grooving operation mainly including a skiving step, thus leading to a significantly lower productivity and hence a higher cost of the light guiding plate.

In view of the above, if the angle which the slanted surfaces 51a and 51b of the groove 51, formed with respect to the reverse side 50b of the light guiding plate, is substantially 45 degrees, it might be expected a satisfactory result will be achieved. In fact, however, this will also cause a lighting unevenness due to the following reasons.

Referring to FIG. 18, an angle α3, that the slanted surfaces 51a and 51b of the groove 51 form with respect to the reverse side 50b of the light guiding plate, is substantially 45 degrees. In consequence, rays of light L1 and L2 striking on the slanted surfaces 51a and 51b are substantially orthogonally reflected and emerge from the face 50a of the light guiding plate in the form of the parallel rays L1 and L2. More specifically, the rays of light emerging from the face of the light guiding plate tend to be separated along the groove bottom 51c into two striped regions of rays of light L1 and L2. In this case, the groove located closer to the light source 52 as shown, for example, will receive rays of light L1 traveling through the light guiding plate with a lesser amount of attenuation, as well as rays of light L2 traveling long distance through the light guiding plate with a greater amount of attenuation, which results in a difference in the amount of light between the two rays of light L1 and L2. Thus, two optical regions having different amounts of attenuation will alternately form relatively distinctly on the face 50a of the light guiding plate 50 as discussed above, and the resultant difference in the amount of light will directly lead to a difference in the luminance BR on the face of the light guiding plate.

SUMMARY OF THE INVENTION

The present invention was conceived to solve the above problems. It is therefore an object of the present invention to provide a light guiding plate comprised of a transparent plate having on its one side a multiplicity of grooves or ridges in which at least the portion where opposing slanted surfaces of the grooves or ridges meet is formed into a curved surface to lower the directivity of rays of light reflected on that portion which may most cause an unevenness in luminance, thus uniformizing the luminance on the light emitting face by virtue of such low-directional rays of light.

Another object of the present invention is to provide a light guiding plate ensuring a uniformity of the luminance despite a reduced number of grooves or ridges formed, to thereby facilitate the formation of the grooves or ridges with the result that its production cost is significantly reduced.

According to a first aspect of the present invention, there is provided a light guiding plate comprised of a transparent plate having on its one side a multiplicity of grooves, each consisting of a pair of slanted surfaces converging toward its bottom whereby rays of light irradiated from lateral sides of the transparent plate are reflected by the slanted surfaces of the grooves and emitted from a face opposite the grooved side of the transparent plate, the light guiding plate being characterized in that among surfaces constituting each of the grooves, at least a groove bottom portion, where the pair of slanted surfaces meet, comprises a curved surface having a curvilinear sectional contour so as to lower a directivity of the rays of light reflected on the curved surface portion, thereby uniformizing the luminance of the entire light emitting face.

According to a second aspect of the present invention, there is provided a light guiding plate comprised of a transparent plate having on its one side a multiplicity of ridges in place of the grooves recited above, the ridges having the same sectional contours as those of the grooves, each of the ridges consisting of a pair of slanted surfaces converging toward its peak, wherein among the ridge forming surfaces, at least the portion where the slanted surfaces meet comprises a curved surface having a curvilinear sectional contour so as to eliminate the directivity of rays of light reflected on the curved surface portion, thereby uniformizing the luminance of the rays of light reflected on the ridge forming surfaces.

According to a third aspect of the present invention, minute unevenness is provided on at least the surface in the vicinity of the groove bottom or the vicinity of the ridge peak, among the groove or ridge surfaces.

It is to be noted that the term "transparent plate" will hereinafter widely refer to any plate material having a light-transmitting property and embrace not only an uncolored so-called transparent body but also a colored one or emulsified one as long as it is light-transmittable.

DESCRIPTION OF THE PREFERRED EMBODIMENTS

Embodiments of the present invention will now be described in more detail with reference to the accompanying drawings.

Figure 1:
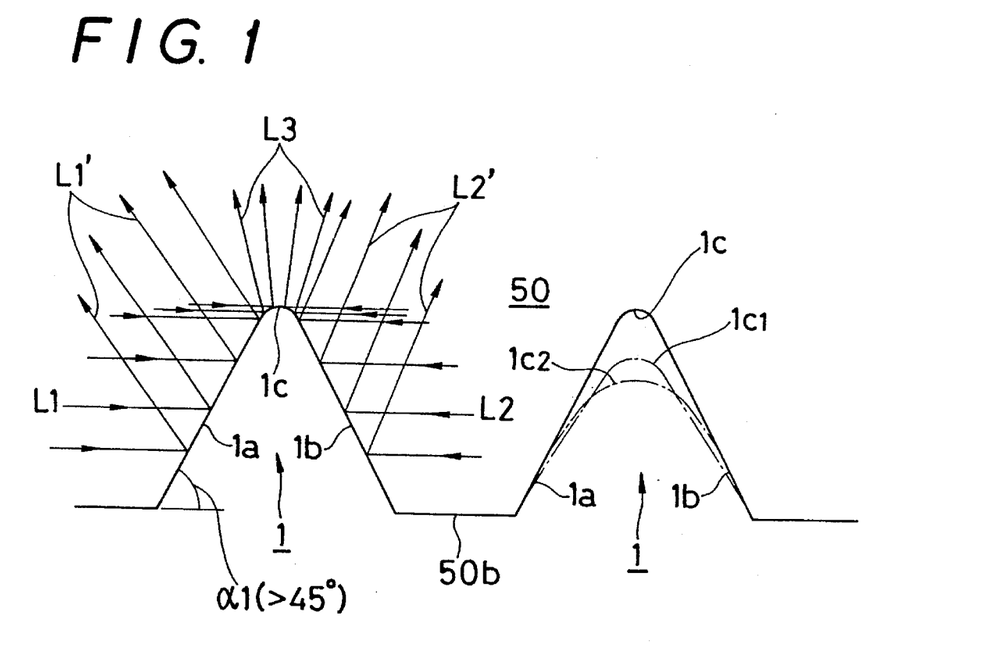
FIG. 1 is an enlarged fragmentary side view of a light guiding plate showing a first embodiment of the present invention.

FIG. 1 depicts a first embodiment of the present invention. The first embodiment has grooves corresponding in position to the grooves shown in FIG. 16 to which reference has been made. A light guiding plate 50 has on a reverse side 50b a multiplicity of grooves generally designated at 1, extending parallel to a widthwise direction of the light guiding plate as of the above-described grooves 51. The grooves 1 each include planar slanted surfaces 1a and 1b opposing each other and exhibiting a rectilinear sectional contour, in substantially the same manner as the conventional configuration shown in FIG. 14. A bottom 1c of the groove 1, where the two slanted surfaces 1a and 1b meet, has a curved surface so as to provide an arc sectional contour.

The above configuration reflects parallel rays of light L1 and L2 in parallel from the planar portions of the slanted surfaces 1a and 1b, respectively. Since an angle 1 formed by the slanted surfaces 1a and 1b with respect to the reverse side 50b of the light guiding plate 50 is more than 45 degrees, rays of light L1' and L2' are reflected by the slanted surfaces 1a and 1b, outwardly in a divergent manner. On the contrary, the groove bottom 1c, intermediate between the slanted surfaces 1a and 1b is fashioned into a curved surface to allow the rays of light L1 and L2 to be thrown back in the form of a reflected ray of light L3 having no directivity. This results in an emergence of the reflected ray of light L3 in a lower luminance region as shown in FIG. 14. Thus irregularly reflected ray of light L3 contributes to make uniform a luminance of the entire surface 50a of the light guiding plate. It is to be appreciated that the reflection area of the reflected ray of light L3 will vary by changing the sectional configuration of the groove bottom as depicted in FIG. 1 by contours 1c and 1c2. It is therefore possible to ensure a uniform luminance throughout the entire surface by the provision of appropriate groove intervals corresponding to the variation of the reflection area.

Figure 2:
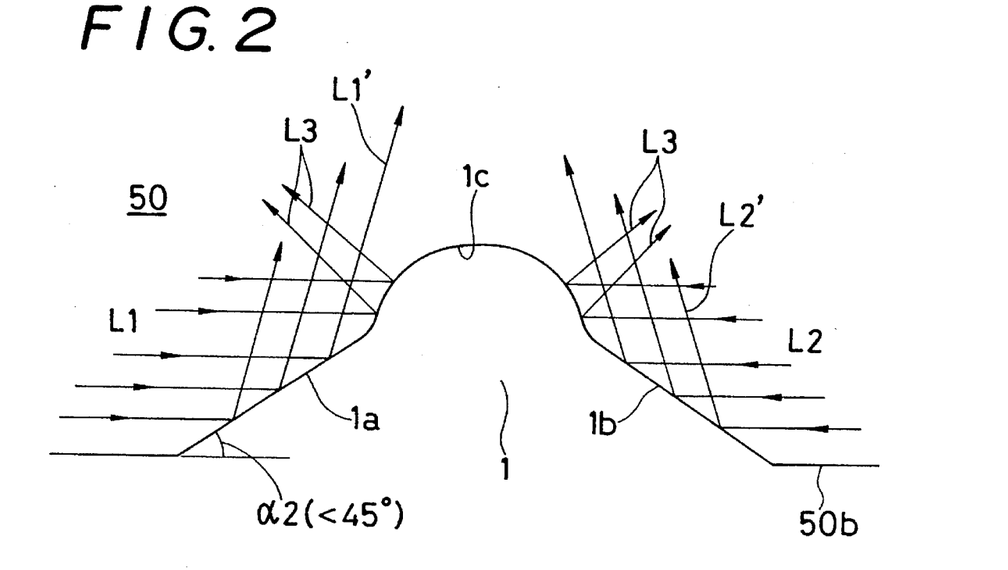
FIG. 2 is an enlarged fragmentary side view of a light guiding plate showing a second embodiment of the present invention.

FIG. 2 depicts a second embodiment of the present invention. The second embodiment comprises grooves generally designated at 1 and corresponding in section to the grooves shown in FIG. 16 to which reference has been made. The grooves 1 each include slanted surfaces 1a and 1b opposing each other to define a rectilinear sectional contour in substantially the same manner as the first embodiment, with an angle 2 formed by the slanted surfaces 1a and 1b with respect to the reverse side 50b of the light guiding plate 50 being less than 45 degrees. The groove 1 further includes a bottom 1c, at which the two slanted surfaces 1a and 1b meet, which has a curved surface so as to present an arc sectional contour. This embodiment differs from the first embodiment in that the curved portion bulges into an interior of the light guiding plate 50.

Due to the angle 2 of the slanted surfaces 1a and 1b being less than 45 degrees in this configuration, reflected rays of light L1' and L2', originating from the rays of light L1 and L2, respectively, are directed inwardly in a convergent manner. On the contrary, the groove bottom 1c, intermediate between the slanted surfaces 1a and 1b, is fashioned into a curved surface bulging into the interior of the light guiding plate 50 to reflect the rays of light L1 and L2 greatly outwardly divergent manner as shown by a reflected ray of light L3 having no directivity. As a result of this, the rays of light L1 and L2, that strike in the vicinity of the groove bottom 1c, a center of convergence, are widely scattered into a nondirectional reflected ray of light L3. The scattered reflection produces a uniformity of luminance over the entire light guiding plate.

Figure 3:
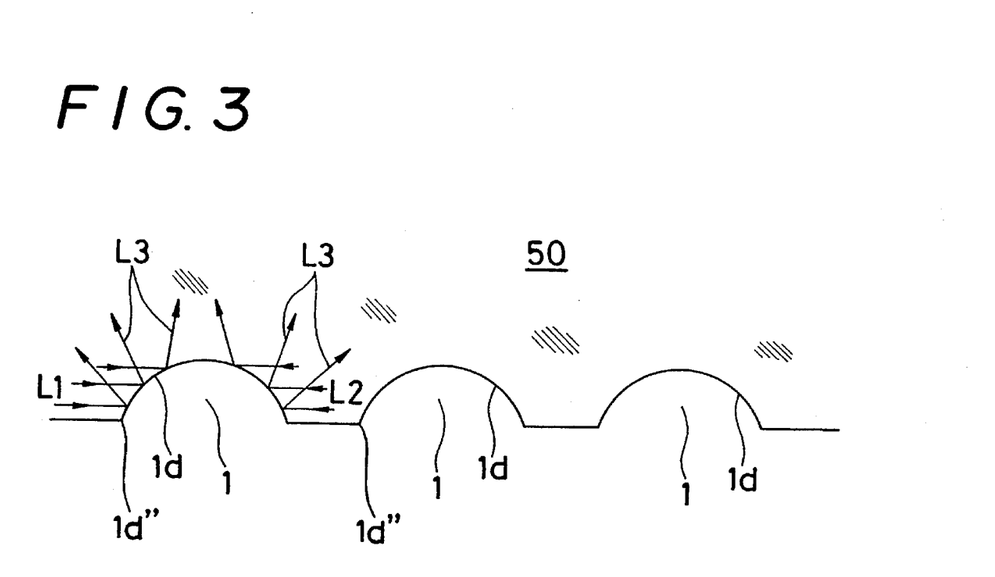
FIG. 3 is an enlarged fragmentary side view of a light guiding plate showing a third embodiment of the present invention.

FIG. 3 depicts a third embodiment of the present invention. In this embodiment, the entire surface defining a groove 1 is formed into a curved surface 1d to thereby reflect almost all of the rays of light L1 and L2 into a nondirectional reflected ray of light L3.

Figure 4:
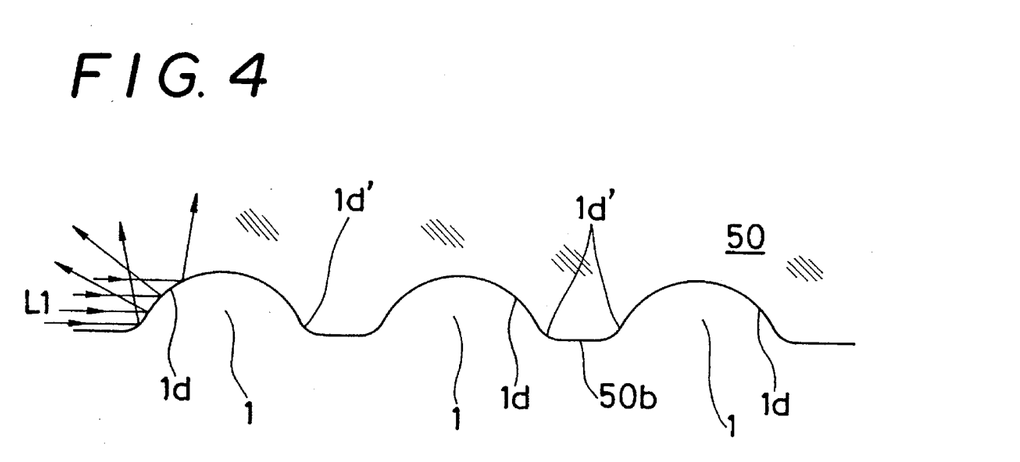
FIG. 4 is an enlarged fragmentary side view of a light guiding plate showing a variant of the third embodiment.

FIG. 4 is a variant of the third embodiment depicted in FIG. 3. The junction between the curved groove forming surface 1d and the reverse side 50b of the light guiding plate 50 is distinctly defined as an abrupt edge portion 1d" in the third embodiment. In the embodiment of FIG. 4 the junction portion takes the form of a curved surface 1d', in other words, the reverse side 50b of the light guiding plate 50 is smoothly connected to the groove forming surface. Since the rays of light L1 and L2 impinging on the light guiding plate 50 are not complete parallel rays, the rays L1 and L2 may contain components which hit the reverse side 50 of the light guiding plate 50 at an angle. Accordingly, the boundary portion fashioned into the curved surface 1d allow the rays of light to be reflected in a nondirectional manner to thereby eliminate a possibility that an edge portion will adversely affect the uniformity of the luminance throughout the front surface 50a of the light guiding plate 50.

Figure 5A:
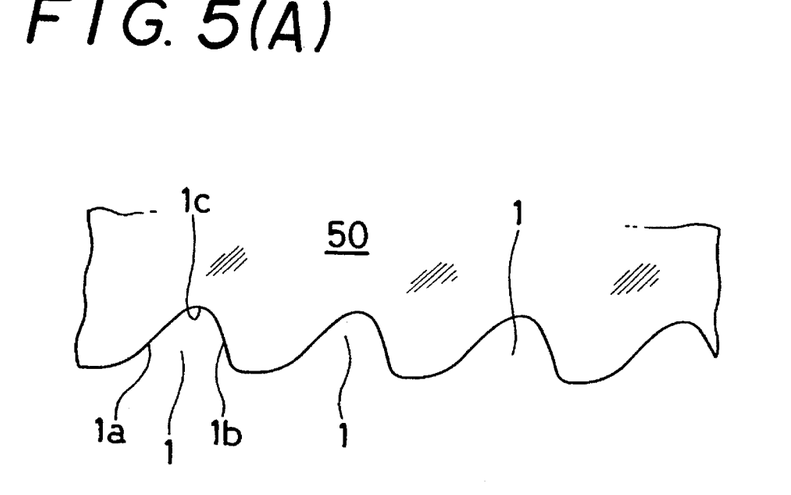
FIG. 5(A) is an enlarged fragmentary side view of a variation of the embodiment of the present invention shown in FIG. 1.
Figure 5B:
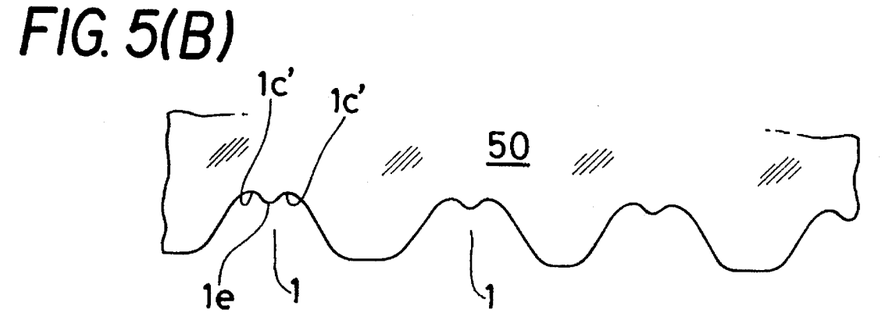
FIG. 5(B) is an enlarged fragmentary side view of another variation of the embodiment of the present invention shown in FIG. 1.
Figure 5C:
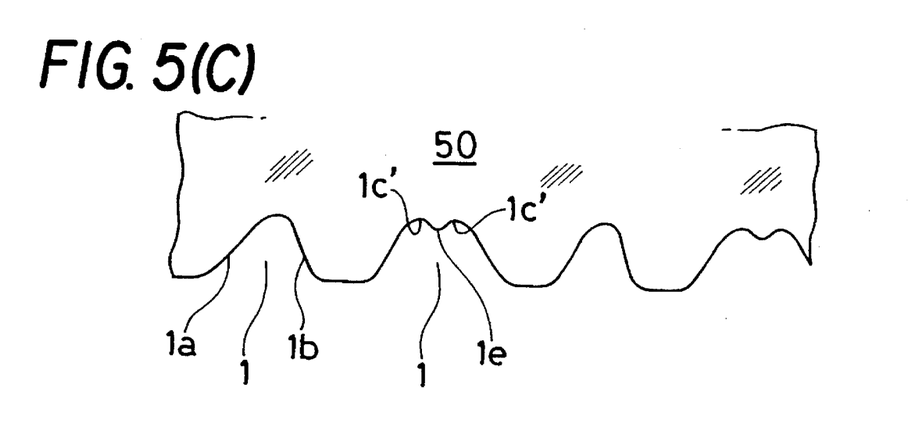
FIG. 5(C) is an enlarged fragmentary side view of a combination of variations shown in FIGS. 5(A) and 5(B)

Referring FIGS. 5(A)–5(C), still further embodiments of groove contours are shown.

Referring first to FIG. 5(A), the groove 1 is generally formed into a curved surface with one slanted surface 1a being a gentle curved surface and the other slanted surface 1b being a steep curved surface to enable the amount of reflection to be varied in response to the amount of light irradiated from both sides of the slanted surfaces, thereby producing uniform the luminance throughout the entire surface of the light guiding plate.

In FIG. 5(B), extending in the middle of the bottom of the groove 1, a ridge 1e defines a pair of groove bottoms 1c' on each side thereof.

Figure 6:
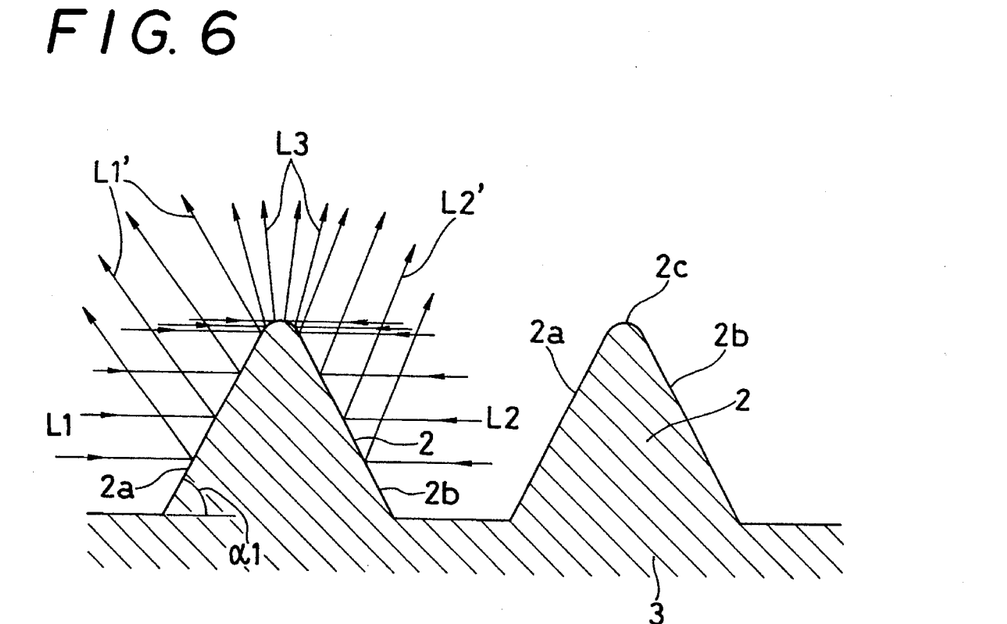
FIG. 6 is an enlarged fragmentary sectional view of the reflection plane of a light guiding plate showing a fourth embodiment of the present invention and having ridges with the same sectional contours as those of the grooves shown in FIG. 1.
Figure 7:
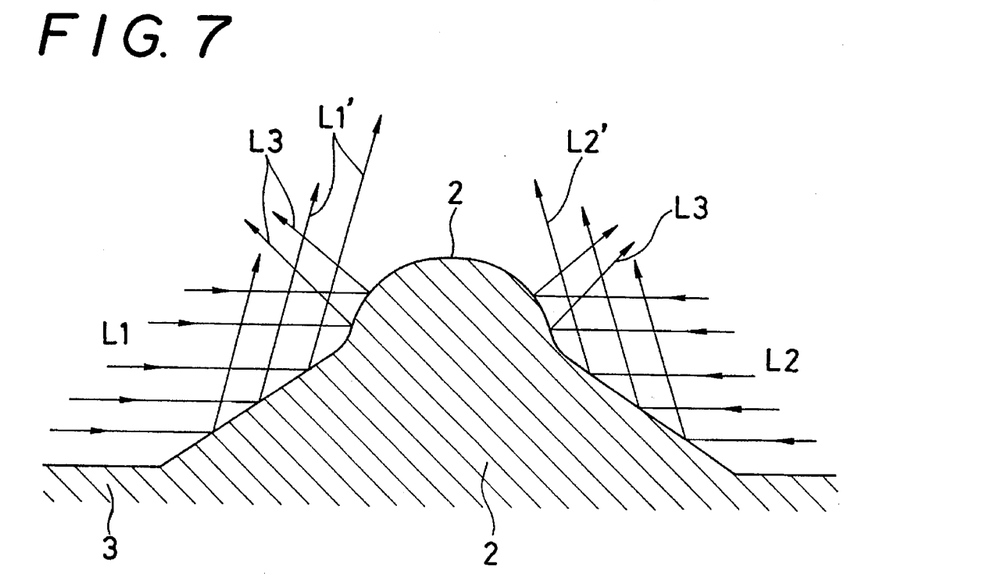
FIG. 7 is an enlarged fragmentary sectional view of the reflection plane of a light guiding plate having ridges with the same sectional contours as those of the grooves shown in FIG. 2.

FIG. 5(C) depicts an alternate arrangement of the grooves shown in FIGS. 5(A) and Referring to FIGS. 6 and 7, a fourth embodiment of the present invention is shown in which formed on a surface of a transparent plate material 3 are ridges 2 having the same sectional contours as those shown in FIGS. 1 and 2, the ridge forming surface serving as a reflection plane. More specifically, the ridge 2 includes slanted surfaces 2a and 2b converging toward a peak 2c which is in the form of a curved surface having a curvilinear sectional contour. These configurations provide the same effects as those of the above grooves when the rays of light L1 and L2 traveling in the air are reflected on the ridges 2, to thereby uniformize the reflected rays thrown back on the ridge forming surface or the reflection plane.

Figure 8:
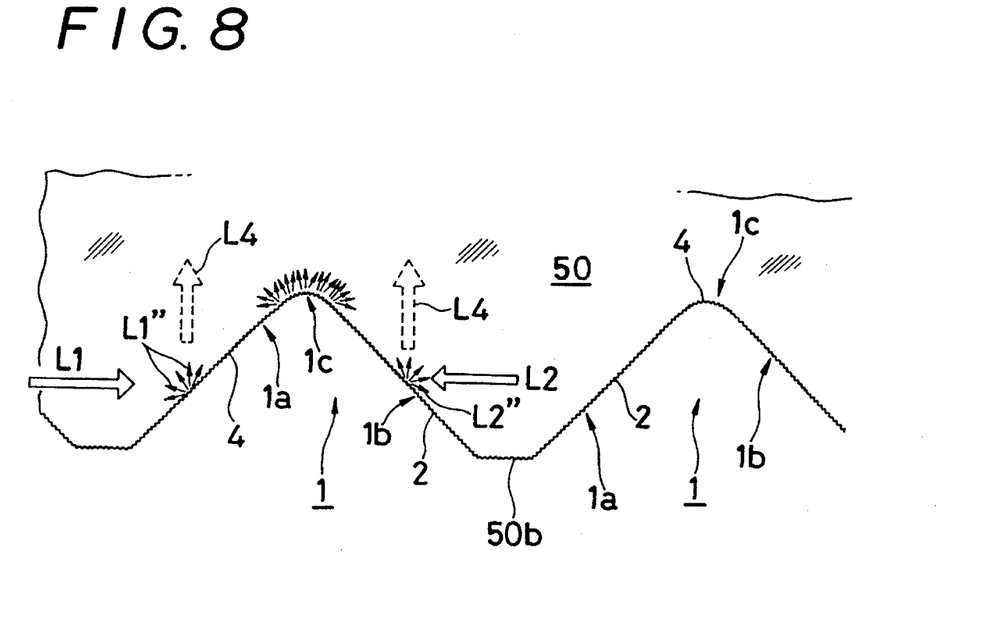
FIG. 8 is an enlarged fragmentary side view of a light guiding plate showing a fifth embodiment of the present invention.

Referring to FIG. 8 a fifth embodiment of the present invention is shown which is based on the first embodiment, however, a minute unevenness is formed on the slanted surfaces 1a and 1b and the surface of the groove bottom 1c, constituting the groove 1, to form minutely uneven surfaces 4. The formation of the minutely uneven surfaces 4 allows the rays of light L1 and L2 to be diffusely reflected producing diffusely reflected rays of light L1" and L2" microscopically. In macroscopic view of the entire grooves, however, they may be considered as reflected rays having a directivity as indicated by L4. Accordingly, the formation of such minutely uneven surfaces 4 will enhance the uniformization of the amount of reflected light in terms of the entire light emitting surface.

Figure 9:
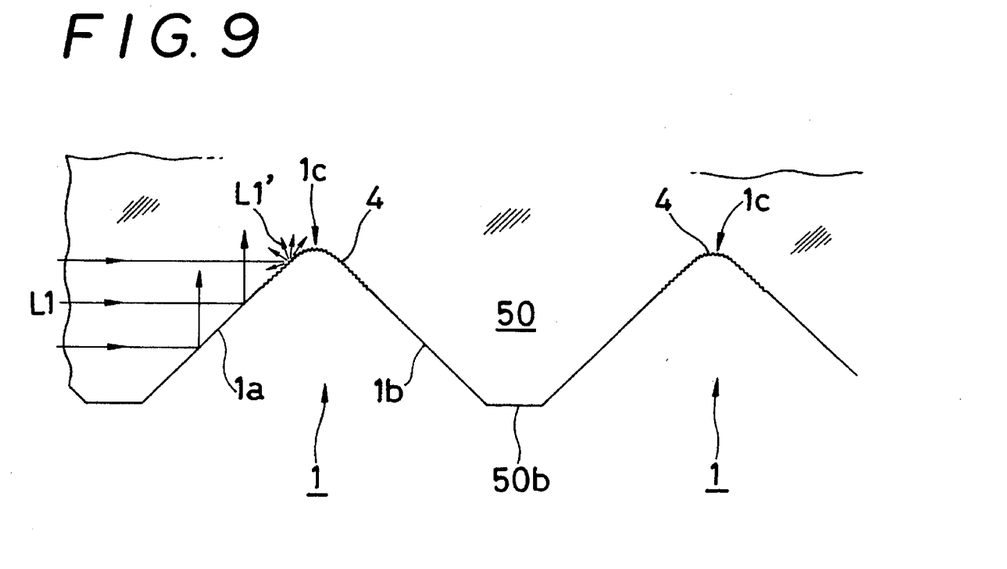
FIG. 9 is an enlarged fragmentary side view of a light guiding plate showing a variant of the embodiment shown in FIG. 8.

Referring to FIG. 9, a variant of the embodiment shown in FIG. 8 is shown wherein a minutely uneven surface 4 is provided exclusively on the groove bottom 1c which may most need the diffusion of light.

Figure 10:
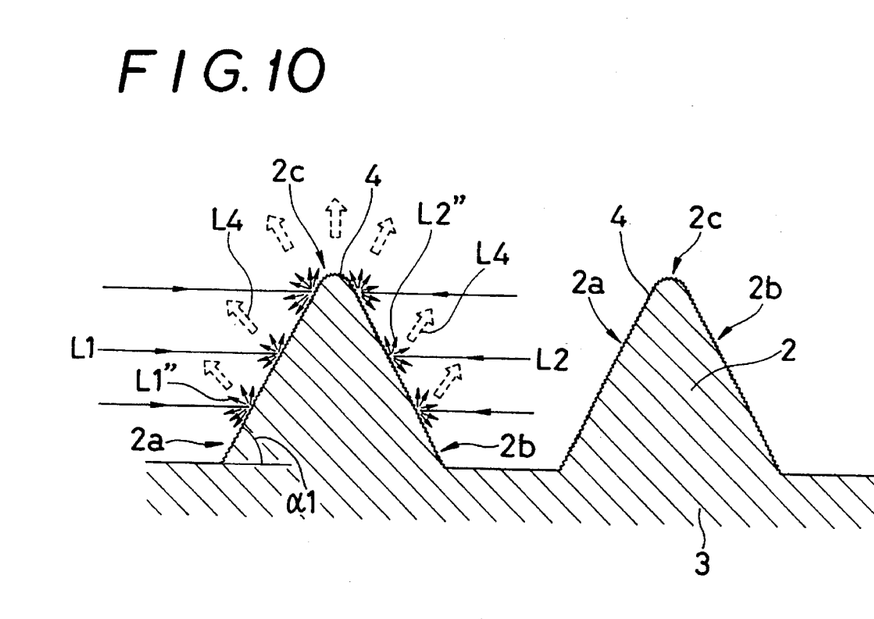
FIG. 10 is an enlarged fragmentary sectional view of the reflection plane having the ridges provided with minutely uneven surfaces, showing a sixth embodiment of the present invention.

Referring to FIG. 10, a sixth embodiment of the present invention is shown which is a variant of the embodiment shown in FIG. 6. The entire surfaces of the ridge 2, that is, all the surfaces including the slanted surfaces 2a and 2b and the peak 2c are fashioned into minutely uneven surfaces 4. By virtue of this configuration, the rays of light L1 and L2 are diffusely thrown back by the slanted surfaces 2a and 2b, producing diffusely reflected rays of light L1'' and L2'', which may be thought of as reflected rays of light having respective directivities corresponding to the contours of the surfaces, as indicated by L4, when the surfaces are macroscopically viewed.

Figure 11:
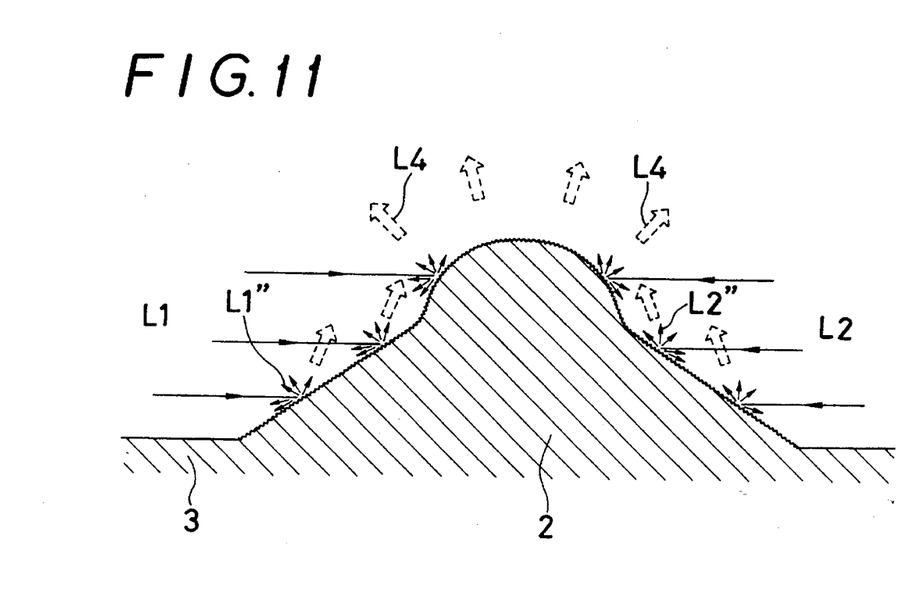
FIG. 11 is an enlarged fragmentary sectional view of a reflection plane including ridges having the sectional contour shown in FIG. 2 and provided with minutely uneven surfaces.

Referring to FIG. 11, a variant of the embodiment shown in FIG. 7 is shown in which the entire surfaces of the ridge 2 having the contours shown are formed into minutely uneven surfaces 4 so as to ensure the effect equivalent to that of the configuration shown in FIG. 10.

Figure 12:
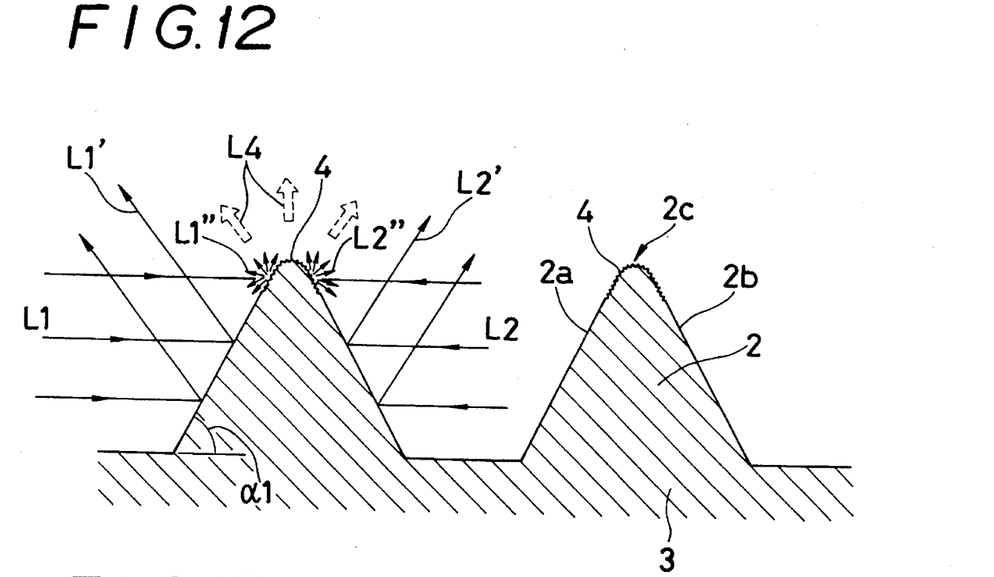
FIG. 12 is an enlarged fragmentary sectional view of a reflection plane, which is a variant of the configuration shown in FIG. 10, including ridges whose peaks are exclusively provided with the minutely uneven surfaces.

Referring to FIG. 12, a variant of the embodiment shown in FIG. 10 is shown, in which among the surfaces constituting the ridge 2, the peak 2c is exclusively provided with the minutely uneven surface 4.

Figure 13:
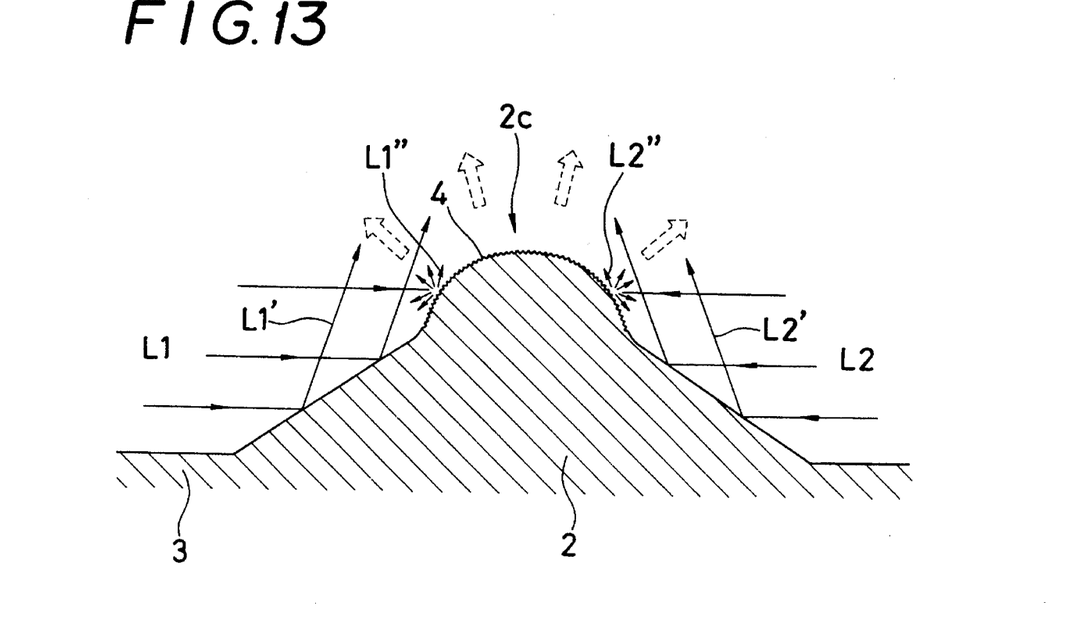
FIG. 13 is an enlarged fragmentary sectional view of a reflection plane, which is a variant of the configuration shown in FIG. 11, including ridges whose peaks are exclusively provided with the minutely uneven surfaces.

Referring to FIG. 13, a variant of the embodiment shown in FIG. 11 is shown in which only the peak 2c is similarly provided with the minutely uneven surface 4.

What is claimed is:

1. A light guiding plate for guiding light emitted into said light guiding plate, comprising:

a transparent plate having a first side with grooves formed therein, a face side opposite said first side and lateral sides parallel to said grooves;

each of said grooves having slanted surfaces converging toward bottom portions of said grooves for reflecting rays of light emitted into said lateral sides of said transparent plate to said face surface for emittance therefrom;

said bottom portions connecting said slanted surfaces and having a curved surface with a curvilinear sectional contour for reflecting said rays of light diffusely to enhance uniformity of luminance of the reflected light rays emitted from an overall expanse of said face surface; and said grooves having perturbations in at least said curved surfaces, minute in relation to said grooves, to further enhance the diffusivity of the reflected rays.

2. A light guiding plate according to claim 1, wherein said slanted surfaces of said groove comprise planar surfaces with said groove bottom being exclusively formed into a curved surface.

3. A light guiding plate according to claim 1, wherein all of said groove forming surfaces, including said slanted surfaces, are curved so that sectional contours of said groove are entirely curvilinear.

4. A light guiding plate according to claim 3, wherein a junction between said slanted surfaces and said first side of said light guiding plate is a curved surface.

5. A light guiding plate according to claim 1 wherein said slanted surfaces of said grooves have perturbations minute in relation to said grooves, to further enhance the diffusivity of the reflected rays.

6. A light guiding plate for reflecting light rays incident thereon, said light guiding plate comprising:

a plate having a side with ridges;

said ridges having peaks and slanted surfaces converging at said peaks;

said peaks each having a curved surface with a curvilinear sectional contour joining said slanted surfaces to effect a diffusivity of said rays of light reflected by said curved surface and an overall uniformity of luminance of the rays of light reflected by said light guiding plate; and said ridges having perturbations in at least said curved surfaces, minute in relation to said ridges, to further enhance the diffusivity of the reflected rays.

7. A light guiding plate according to claim 6, wherein said slanted surfaces of said ridge are planar surfaces said peaks are exclusively formed into said curved surface.

8. A light guiding plate according to claim 6, wherein said slanted surfaces are curved surfaces so that cross-sectional contours of said ridges are entirely curvilinear.

9. A light guiding plate according claim 6 wherein said slanted surfaces have perturbations minute in relation to said ridges, to further enhance the diffusivity of the reflected rays.

10. A light guiding plate, for redirecting light rays incident thereon, comprising:

a transparent plate having first and second surfaces opposing each other, and a lateral side;

said first side surface having grooves, each with two slanted sides which converge toward a virtual line of intersection;

a rounded trough surface connecting said two slanted sides at a bottom of each of said grooves, said rounded trough surface having an arcuate cross-sectional contour extending into said transparent plate beyond virtual projections of said two slanted sides; and said lateral side allowing reception of said incident light rays into said transparent plate with said slanted sides and said rounded trough surface effecting diffuse reflection of said light rays to said second surface for emittance therefrom.

11. The light guiding plate according to claim 10 wherein said slanted sides form an acute angle with a plane of said first surface which is less than 45 degrees.

12. The light guiding plate according to claim 10 wherein said arcuate cross-sectional contour extends into said transparent plate beyond said virtual line of intersection.

13. A light guiding plate, for redirecting light rays incident thereon, comprising:

a transparent plate having first and second surfaces opposing each other, and first and second lateral sides opposing each other;

said first surface having grooves parallel each other and said first and second lateral sides;

said grooves each having first and second slanted sides which converge toward a virtual line of intersection, said first slanted sides being sides of said grooves closest to said first lateral surface and said second slanted sides being sides of said grooves closest to said second lateral surface;

said first slanted sides each generally defining a first angle with a plane of said first surface and said second slanted sides each generally defining a second angle with said plane of said first surface;

a rounded surface connecting said first and second slanted sides at a bottom of each of said grooves;

said first and second lateral sides allowing reception of said incident light rays into said transparent plate; and said first angle and said second angle being non-equal to reflect differing proportions of said light rays entering respective ones of said first and second lateral sides, said first angle controlling an amount of said light rays entering from said first lateral side which is reflected and said second angle controlling an amount of said light ray entering from said second lateral side which is reflected.

14. A light guiding plate, for redirecting light rays incident thereon, comprising:

a transparent plate having first and second surfaces opposing each other, and a lateral side;

said first surface having grooves, each with two slanted sides which converge toward a virtual line of intersection;

a rounded ridge surface connecting said two slanted sides at a bottom of each of said grooves, said rounded ridge surface having a curvilinear cross-sectional contour subtending a virtual angle defined by projections said two slanted sides; and surface effecting diffuse reflection of said light rays to said second surface for emittance therefrom.

15. A light guiding plate for reflecting light rays incident thereon, said light guiding plate comprising:

a plate having a side with ridges;

said ridges each having slanted sides converging toward virtual lines of intersection;

said ridges each having a rounded surface with an arcuate cross-sectional contour joining said slanted sides and extending said ridges outside of a boundary defined by projections of said slanted sides to said virtual lines of intersection; and said slanted sides and said rounded surfaces effecting a diffusivity of said rays of light reflected and providing an overall uniformity of luminance of the rays of light reflected said light guiding plate.

16. The light guiding plate according to claim 15 wherein said slanted sides form an acute angle with a plane of said first surface which is less than 45 degrees.

17. The light guiding plate according to claim 15 wherein said arcuate cross-sectional contour extends into said transparent plate beyond said virtual line of intersection.

18. A light guiding plate according to claim 1 wherein said slanted sides each define an acute angle with a plane of said first surface, said acute angle being greater than 45 degrees.

19. A light guiding plate according to claim 6 wherein said slanted surfaces each define an acute angle with a plane of said side with said ridges, said acute angle being greater than 45 degrees.

* * * * *